United States Patent
Oura

(10) Patent No.: US 11,988,614 B2
(45) Date of Patent: May 21, 2024

(54) CYLINDRICAL INNER FACE INSPECTION DEVICE

(71) Applicant: Online Business Solution. Inc, Tokyo (JP)

(72) Inventor: Takashi Oura, Tokyo (JP)

(73) Assignee: Online Business Solution. Inc, Tokyo (JP)

( * ) Notice: Subject to any disclaimer, the term of this patent is extended or adjusted under 35 U.S.C. 154(b) by 46 days.

(21) Appl. No.: 17/607,142

(22) PCT Filed: May 11, 2020

(86) PCT No.: PCT/JP2020/018788
§ 371 (c)(1),
(2) Date: Oct. 28, 2021

(87) PCT Pub. No.: WO2021/117265
PCT Pub. Date: Jun. 17, 2021

(65) Prior Publication Data
US 2022/0349835 A1 Nov. 3, 2022

(30) Foreign Application Priority Data
Dec. 13, 2019 (JP) ................................. 2019-225680

(51) Int. Cl.
*G01N 21/954* (2006.01)

(52) U.S. Cl.
CPC ... *G01N 21/954* (2013.01); *G01N 2021/9546* (2013.01)

(58) Field of Classification Search
CPC .............. G01N 21/954; G01N 2021/9546
See application file for complete search history.

(56) References Cited

U.S. PATENT DOCUMENTS

| | | | | |
|---|---|---|---|---|
| 7,944,554 B2 * | 5/2011 | Horiuchi | ............. | G01N 21/954 356/237.2 |
| 8,424,385 B2 * | 4/2013 | Park | .................... | F22B 37/005 376/249 |
| 9,581,556 B1 * | 2/2017 | Segall | .................. | G01N 21/954 |

FOREIGN PATENT DOCUMENTS

| | | |
|---|---|---|
| DE | 102004043209 | 3/2006 |
| EP | 1653225 | 3/2006 |

(Continued)

OTHER PUBLICATIONS

International Search Report in PCT/JP2020/018788 dated Jul. 21, 2020.

(Continued)

*Primary Examiner* — Hung V Nguyen

(57) ABSTRACT

An inspection probe is configured by inserting a cylindrical hollow glass pipe configured by quartz glass into a cylindrical exterior member configured by stainless steel or the like. The glass pipe transmits a laser beam from a laser light emission device as irradiation light to a leading end part through a hollow region. In the inspection probe, the irradiation light is transmitted to the leading end part through the hollow region of the glass pipe and is reflected by a reflection mirror provided at the leading end part, whereby the inner face of an inspection target is irradiated by the irradiation light, and reflected light reflected from the inner face of the inspection target is reflected by the reflection mirror and transmitted to a photoelectric conversion unit via a region other than the hollow region of the glass pipe.

4 Claims, 15 Drawing Sheets

(56) References Cited

FOREIGN PATENT DOCUMENTS

| JP | 06-180291 | 6/1994 |
| JP | 2011-185629 | 9/2011 |
| JP | 5265290 | 8/2013 |
| JP | 2017-053783 | 3/2017 |

OTHER PUBLICATIONS

English language abstract of JP 5265290.
Notification of Office Action Dated Nov. 30, 2023 From The State Intellectual Property Office of the People's Republic of China Re. Application No. 202080038982.7 and Its Translation Into English. (12 Pages).
Supplementary European Search Report and the European Search Opinion Dated Nov. 21, 2023 From the European Patent Office Re. Application No. 20899525.8. (8 Pages).

\* cited by examiner

CYLINDRICAL INNER FACE INSPECTION DEVICE

TECHNICAL FIELD

The present invention relates to a cylindrical inner face inspection device for inspecting the state of an inner surface of a cylindrical inspection target in terms of, for example, the presence or absence of scratches.

BACKGROUND ART

Among various products such as automobiles and electric appliances, there are those that use cylindrical members and components provided with cylindrical holes. If, for example, there are scratches on, or foreign matter or dirt adhered to, the cylindrical inner surface of these members or components, problems occur with respect to product performance and quality, and therefore, various inspection methods and inspection devices have been proposed for inspecting the state of the cylindrical inner surface in terms of, for example, the presence or absence of scratches.

For example, in order to inspect the inner surface of an automobile engine cylinder, brake master cylinder, or the like for the presence or absence of scratches, an inspection method such as performing image capture from outside a cylindrical cavity with a device such as a camera, and an inspection method in which a cylindrical inspection probe with an optical element or the like attached to the leading end is inserted into a cylindrical cavity and the inner surface is inspected with a camera or laser beam, have been proposed.

Among these various inspection methods, a method has been proposed in which, in order to enable high-speed inspection of the internal surface of small-diameter holes, by irradiating the inner surface of the cavity of the inspection target with a laser beam and measuring the intensity of the reflected light, the inner surface of the inspection target cavity is inspected for the presence or absence of scratches (see, for example, Patent Document 1).

Patent Document 1 discloses a surface inspection device configured such that the surface of an object to be inspected is irradiated with a laser beam via a light induction space inside a rotary cylinder, which is freely rotatably attached to a main body having a laser oscillator, and the reflected laser beam from the surface of the object to be inspected is transmitted to a determination processing device at the main body side via plural optical fibers disposed inside the rotary cylinder. With this surface inspection device, the presence or absence of scratches or the like at the cylindrical inner surface of the inspection target is determined by detecting changes in the intensity of the reflected laser beam.

PRIOR ART DOCUMENTS

Patent Documents

[Patent Document 1] Japanese Patent No. 5265290

SUMMARY OF THE INVENTION

A conventional inspection device such as that described above has a configuration such that reflected light from the inner face of the cylinder is transmitted by an optical fiber bundle configured by plural optical fibers installed inside the rotary cylinder, which is an inspection probe, and is delivered to an optical detection element such as a photodiode.

However, the optical fibers are configured by a core and a cladding, and only the reflected light received by the core portion is transmitted. In addition, in a case in which an optical fiber bundle for transmitting reflected light is installed in the cylindrical rotary cylinder separately from an optical path for allowing passage of irradiation light for irradiating the inspection target surface, in order to configure a hollow structure in order to secure the optical path for allowing passage of the irradiation light, it is necessary to use a pipe-shaped reinforcement material.

As a result, the effective light receiving area for the reflected light with respect to the cross-sectional area of the rotary cylinder is reduced. Therefore, the intensity of the reflected light that is transmitted is inevitably reduced, and it is necessary to ensure that a photoelectric conversion sensor or the like for detecting the intensity of the reflected light is highly sensitive.

Further, by installing an optical fiber bundle, a pipe-shaped reinforcement member, and the like inside the rotary cylinder, problems such as the configuration of the inspection probe becoming complicated, manufacturing being time-consuming and troublesome, and high costs, also occur.

In addition, in a case in which deviation occurs in the optical fibers that receive the reflected light, among the plural optical fibers configuring the optical fiber bundle, there is a possibility that accurate inspection cannot be performed because the light receiving sensitivity changes depending on the positional relationship with the photoelectric conversion sensor.

An object of the present invention is to provide a cylindrical inner face inspection device in which, compared to a configuration in which reflected light is transmitted by an optical fiber bundle inside an inspection probe, the amount of reflected light transmitted can be increased and, in addition, the configuration of the inspection probe can be simplified.

The present invention is a cylindrical inner face inspection device, including:

a laser light emission device configured to generate a laser beam for irradiation at an inner face of a cylindrical inspection target;

an inspection probe including a pipe-shaped member formed from a transparent material, the pipe-shaped member being configured to transmit the laser beam from the laser light emission device as irradiation light through a hollow region, a cylindrical exterior member configured to internally accommodate the pipe-shaped member, and a reflective member provided at a leading end part of the exterior member, the irradiation light being irradiated onto the inner face of the inspection target by the irradiation light being transmitted through the hollow region of the pipe-shaped member to the leading end part and by being reflected by the reflective member provided at the leading end part, and reflected light reflected from the inner face of the inspection target being reflected by the reflective member and transmitted through a region other than the hollow region of the pipe-shaped member;

a rotation device configured to rotate the inspection probe;

a photoelectric conversion unit configured to convert the reflected light, which has been emitted from an end face of the pipe-shaped member at an opposite end from the leading end part of the inspection probe, into an electrical signal; and a movement device configured to move a main body part including the laser light emission device, the inspection probe, the rotation device and the photoelectric conversion unit.

According to the cylindrical inner face inspection device of the present invention, because the inspection probe is configured by a pipe-shaped member, an exterior member, and a reflective member, compared with a conventional inspection probe configured by a bundle of plural optical fibers, the configuration of the inspection probe can be simplified. Further, according to the cylindrical inner face inspection device of the present invention, because the configuration is such that the entire end face of the pipe-shaped member receives the reflected light, the light receiving area is wider compared to a case in which the reflected light is received by plural optical fibers, and the amount of reflected light that is transmitted can be increased.

Further, in another cylindrical inner face inspection device of the present invention, the photoelectric conversion unit includes a substrate member that is provided with an opening for the laser beam from the laser light emission device to pass through, a photoelectric conversion sensor is installed at a periphery of the opening, and the substrate member is disposed such that the photoelectric conversion sensor is positioned in a vicinity of the end face of the glass pipe at the opposite end from the leading end part of the inspection probe.

Further, in another cylindrical inner face inspection device of the present invention, an optical fiber for transmitting the laser beam from the laser light emission device to the leading end part of the inspection probe may be provided in the hollow region of the glass pipe.

In addition, in another cylindrical inner face inspection device of the present invention, the pipe-shaped member may be configured by a cylindrical glass pipe configured by quartz glass.

According to the present invention, compared to a configuration in which reflected light is transmitted by an optical fiber bundle inside an inspection probe, it is possible to obtain the effect of being able to provide a cylindrical inner face inspection device capable of increasing the amount of reflected light that is transmitted and simplifying the configuration of the inspection probe.

DETAILED DESCRIPTION

Next, an embodiment of the present invention will be described in detail with reference to the drawings.

Figure 1:
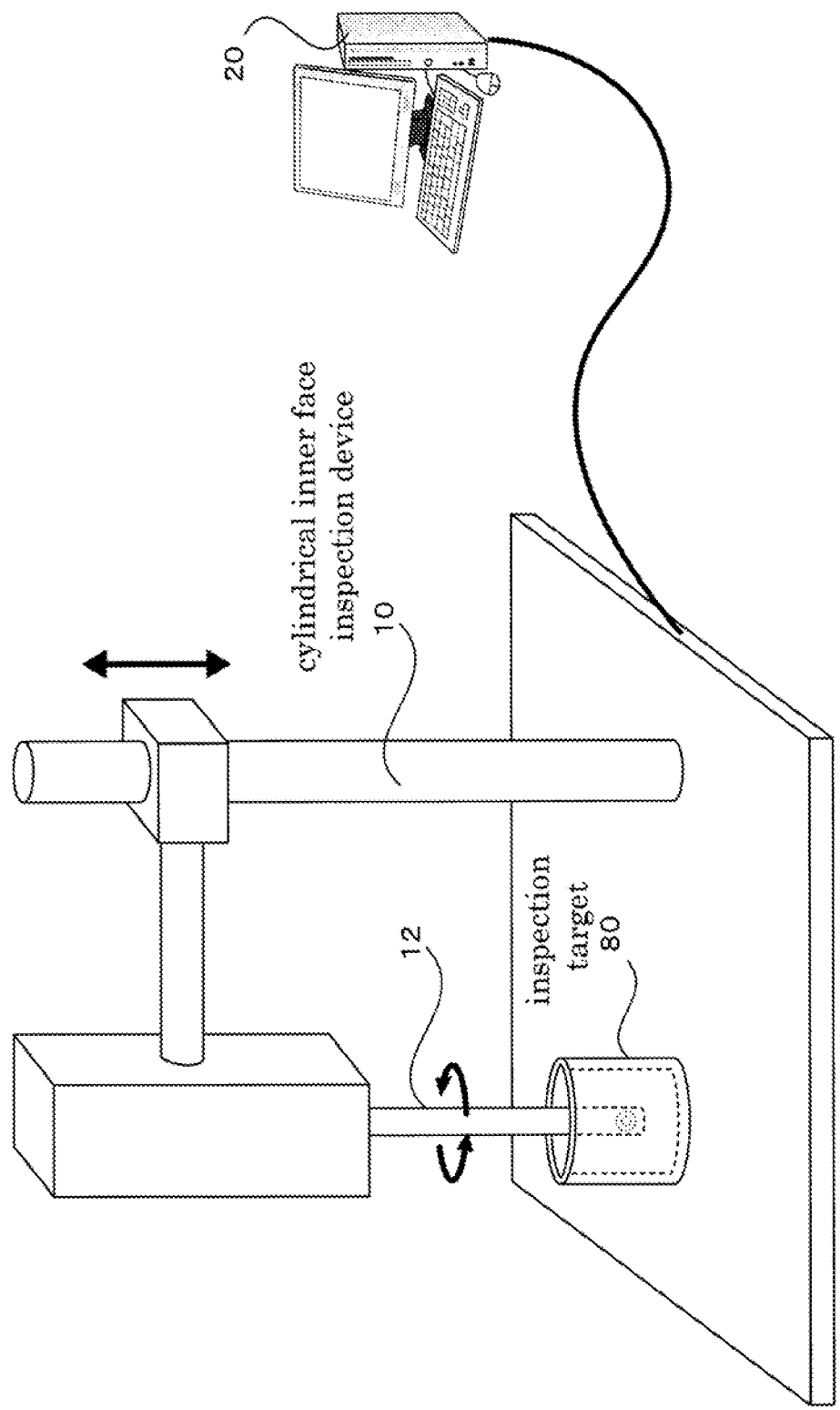
FIG. 1 is a perspective view for explaining a schematic configuration of a cylindrical inner face inspection device 10 of an embodiment of the present invention.

FIG. 1 is a perspective view for explaining a schematic configuration of a cylindrical inner face inspection device 10 of an embodiment of the present invention.

The cylindrical inner face inspection device 10 of the present embodiment is, for example, a device for inspecting the state of the inner face (or inner surface) of a cylindrically-shaped object such as an inspection target 80. In the cylindrical inner face inspection device 10, when performing an inspection of the state of the inner surface of the inspection target 80, an inspection probe 12 is inserted into an inspection target cavity of the inspection target 80. Then, the inspection probe 12 moves vertically while rotating at high speed, whereby inspection is performed by scanning the entire inner face of the inspection target 80.

A terminal device 20 such as a personal computer is connected to the cylindrical inner face inspection device 10 of the present embodiment, and performs processing to control the operation of the cylindrical inner face inspection device 10 and to display inspection results, for example. Here, the terminal device 20 is an example of a device that controls the cylindrical inner face inspection device 10, and various devices such as smartphones and tablet terminals may be connected to the cylindrical inner face inspection device 10 by a wireless link to perform processing such as controlling the operation of the cylindrical inner face inspection device 10 and displaying the inspection results. Further, it is also possible to configure a control unit that performs control of the operation of the cylindrical inner face inspection device 10, a display unit that displays the inspection results, and the like, so as to be integrated with the cylindrical inner face inspection device 10.

Figure 2:
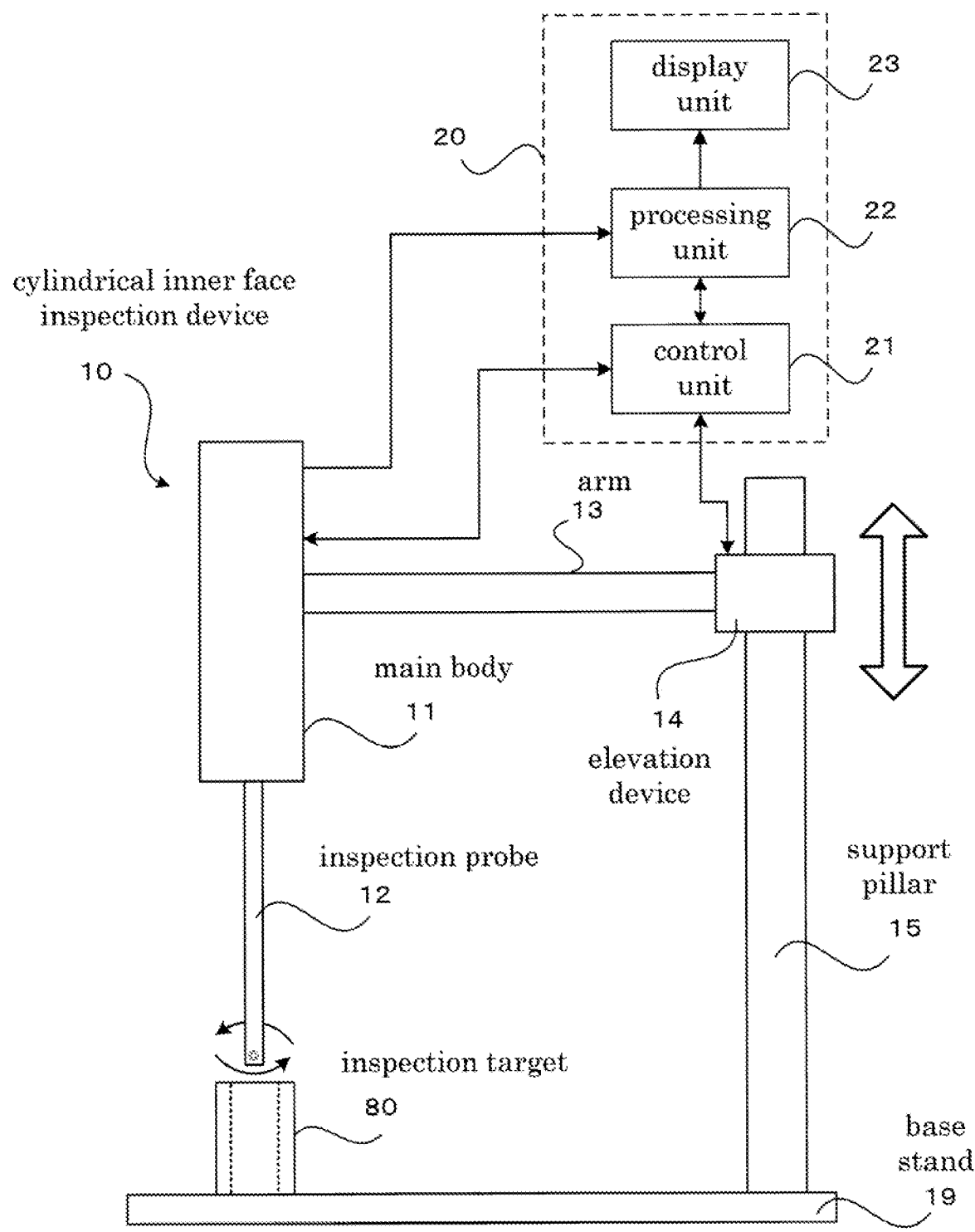
FIG. 2 is a diagram showing an appearance of the cylindrical inner face inspection device 10 of the embodiment of the present invention when viewed from the side.

Next, FIG. 2 shows the appearance of the cylindrical inner face inspection device 10 of the present embodiment when viewed from the side. The cylindrical inner face inspection device 10 of the present embodiment is, as shown in FIG. 2, configured by a main body 11, an inspection probe 12, an arm 13, an elevation device 14, a support pillar 15, and a base stand 19.

The support pillar 15 is vertically supported on the base stand 19. Further, the elevation device 14 is attached to the support pillar 15, and the elevation device 14 is configured to move in the vertical direction along the support pillar 15. The arm 13 is provided in the horizontal direction from the elevation device 14, and the main body 11 is attached to the leading end of the arm 13.

Further, the inspection probe 12, which rotates at high speed when performing an inspection, is attached to the main body 11. The inspection probe 12 rotates at a high speed of 1000 rpm or more; for example, 2000 to 4000 rpm.

At the leading end of the inspection probe 12, an opening for emitting a laser beam is provided, and the configuration is such that this laser beam scans the inner face of the inspection target 80 as irradiation light.

Further, the terminal device 20 includes a control unit 21, a processing unit 22, and a display unit 23. The control unit 21 controls the operation of the elevation device 14 and the main body 11 of the cylindrical inner face inspection device 10. The processing unit 22 inputs an intensity signal of reflected light that is output from the main body 11, and performs determination processing that determines whether or not there are any scratches or the like on the inner face of the inspection target 80. The display unit 23 displays the determination result from the processing unit 22.

The processing unit 22 monitors fluctuations in the intensity of the light reflected from the inner surface of the inspection target 80 and, for example, in a case in which the intensity of the reflected light increases or decreases by a preset value or more, it is determined that there is a scratch or foreign matter or the like on the inner face of the inspection target 80. Here, the processing unit 22 does not monitor the value itself of the received light intensity of the reflected light, but rather, performs a determination as to the presence or absence of scratches or the like based on the continuity and the like of the received light intensity during the inspection as criteria.

Next, the configuration of the main body 11 shown in FIG. 2 will be described in detail with reference to FIG. 3.

Figure 3:
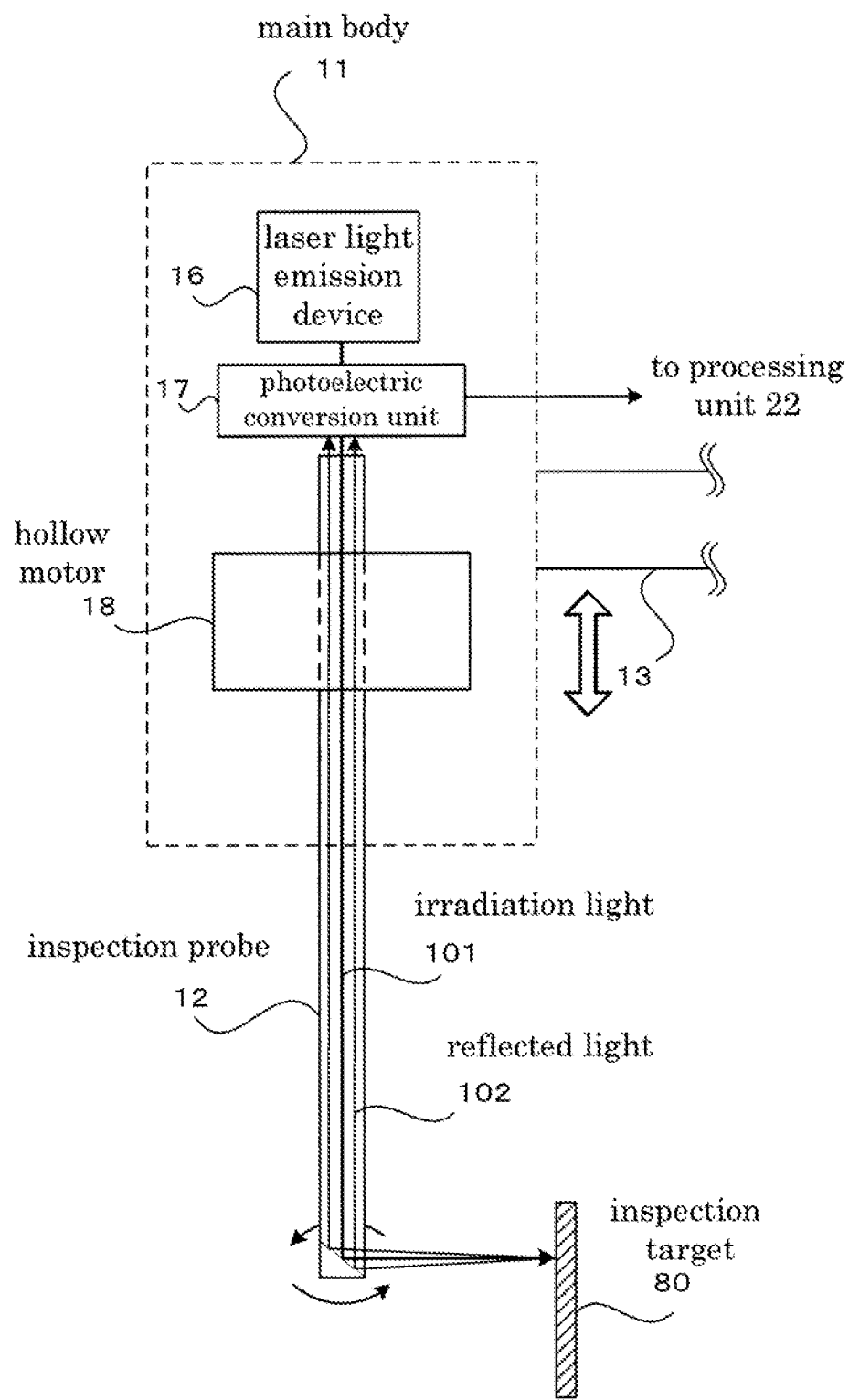
FIG. 3 is a diagram for explaining the details of the configuration of the main body 11 shown in FIG. 2.

As shown in FIG. 3, the main body 11 includes a laser light emission device 16, a photoelectric conversion unit 17, and a hollow motor 18, in addition to the inspection probe 12.

The laser light emission device 16 generates a laser beam for irradiating the inner face of a cylindrical inspection target.

The hollow motor 18 is a motor configured with a hollow rotating shaft, and is a rotation device that rotates the inspection probe 12 by means of insertion of the inspection probe 12 into the hollow portion. In this embodiment, the inspection probe 12 will be described based on a configuration in which the inspection probe 12 is rotated by the hollow motor 18; however, the rotation device is not limited to this kind of configuration, and it also would be possible to use a rotation device having a configuration in which a pulley is rotated by a motor and the rotational force of the pulley is transmitted to the inspection probe 12 to rotate the inspection probe 12.

The photoelectric conversion unit 17 converts reflected light, which has been emitted from an end face at an opposite end from the leading end part of the inspection probe 12, into an electric signal. The electric signal, indicating the intensity of the reflected light converted by the photoelectric conversion unit 17, is transferred to the processing unit 22 of the terminal device 20.

The main body 11, including the laser light emission device 16, the inspection probe 12, the hollow motor 18, and the photoelectric conversion unit 17, is connected to the elevation device 14 by the arm 13, and is configured to be moved vertically by the elevation device 14.

In this embodiment, a configuration in a case in which the main body 11 is moved vertically by the elevation device 14 to perform an inspection will be described; however, it also would be possible to replace the arm 13, the elevation device 14, the support pillar 15, and the like, with a robot arm. In addition, in a case in which the hole of the inspection target is horizontal, the device may be used in a state in which it is laid on its side, and in such a case, the main body 11 is moved in a horizontal direction. That is, the elevation device 14 may function as a movement device that moves the main body 11.

Further, as shown in FIG. 3, the configuration is such that the laser beam generated by the laser light emission device 16 passes through the photoelectric conversion unit 17 as irradiation light 101, passes through the hollow region within the inspection probe 12, reaches the leading end part of the inspection probe 12, has its direction changed by reflection at this leading end part and is radiated onto the inner face of the inspection target 80. Then, the configuration is such that reflected light 102 reflected at the inner face of the inspection target 80 is transmitted through the inspection probe 12 and reaches the photoelectric conversion unit 17. The detailed configuration of the inspection probe 12 and the photoelectric conversion unit 17 will be described below.

Figure 4:
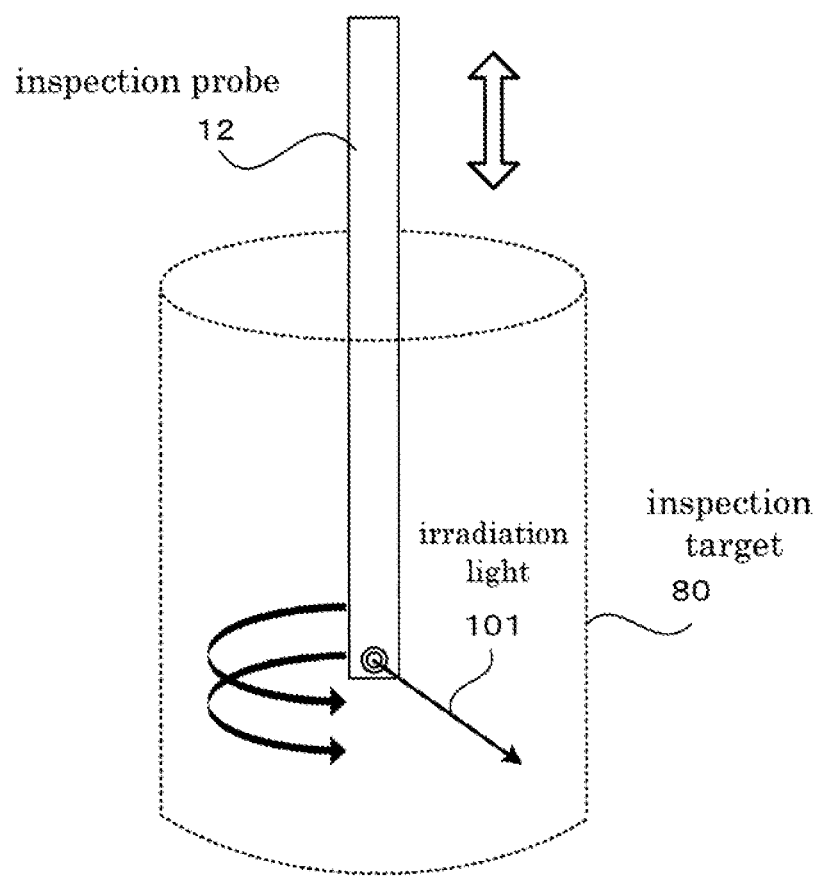
FIG. 4 is a diagram for explaining how an inspection probe 12 is moved vertically within a cavity of an inspection target 80 by an elevation device 14, in a state of being rotated at high speed.

Next, with reference to FIGS. 4 and 5, an aspect when an inspection of the inner face of the inspection target 80 is performed by the cylindrical inner face inspection device 10 of the present embodiment is explained.

In a case of performing an inspection of the inner face of the inspection target 80, in a state in which the inspection probe 12 is rotating at high speed as shown in FIG. 4, it is moved vertically inside the cavity of the inspection target 80 by the elevation device 14. As a result, the irradiation light 101 from the inspection probe 12 scans the entire inner face of the inspection target 80.

Figure 5A:
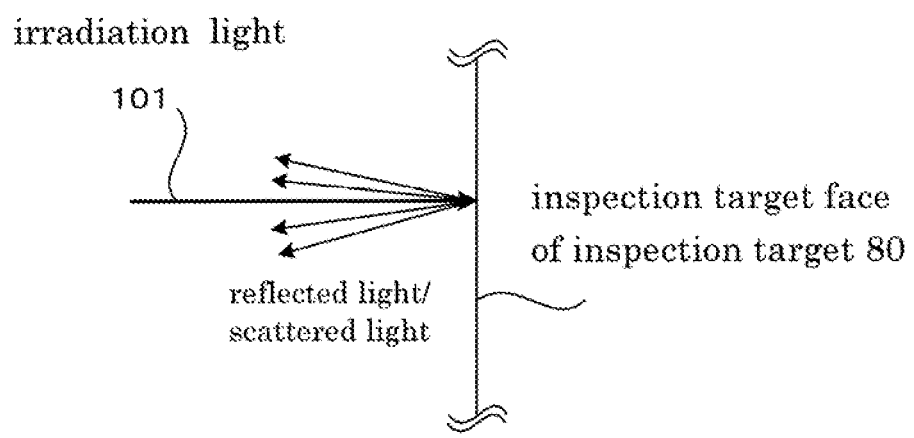
FIG. 5A is a diagram showing the state of reflected light/scattered light in a case in which there are no abnormalities such as scratches on the inspection target surface of the inspection target 80.
Figure 5B:
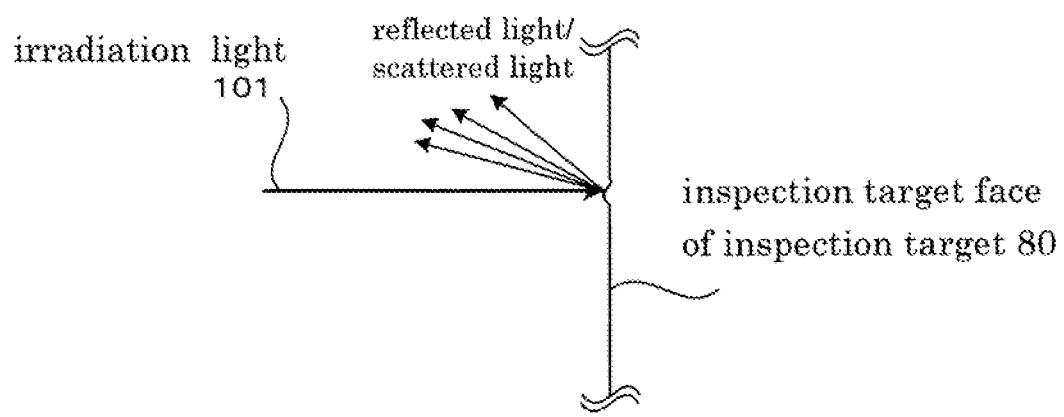
FIG. 5B is a diagram showing the state of reflected light/scattered light in a case in which there is an abnormality such as a scratch.

Next, the state of reflected light/scattered light when there are no abnormalities such as scratches on the inner face of the inspection target 80—that is, the inspection target face—and the state of reflected light/scattered light when there is an abnormality such as a scratch are shown in FIGS. 5A and 5B, respectively.

Referring to FIG. 5A, in a case in which there are no abnormalities such as scratches on the inspection target face of the inspection target 80, it is evident that the irradiation light 101 is uniformly reflected or scattered at the point of irradiation. In contrast, referring to FIG. 5B, in a case in which there is an abnormality such as a scratch on the inspection target face of the inspection target 80, it is evident that the irradiation light 101 is not uniformly reflected or scattered at the point of irradiation, but is reflected or scattered in a specific direction.

That is, when the irradiation light 101 is scanned on the inspection target face of the inspection target 80, the intensity of reflected light changes in places where there are abnormalities such as scratches. Therefore, in the processing unit 22, this change is detected and it is determined that there is an abnormality of some kind at the inspection target face of the inspection target 80.

Next, the configuration of the inspection probe 12 shown in FIGS. 2 and 3, for example, is explained.

Figure 6:
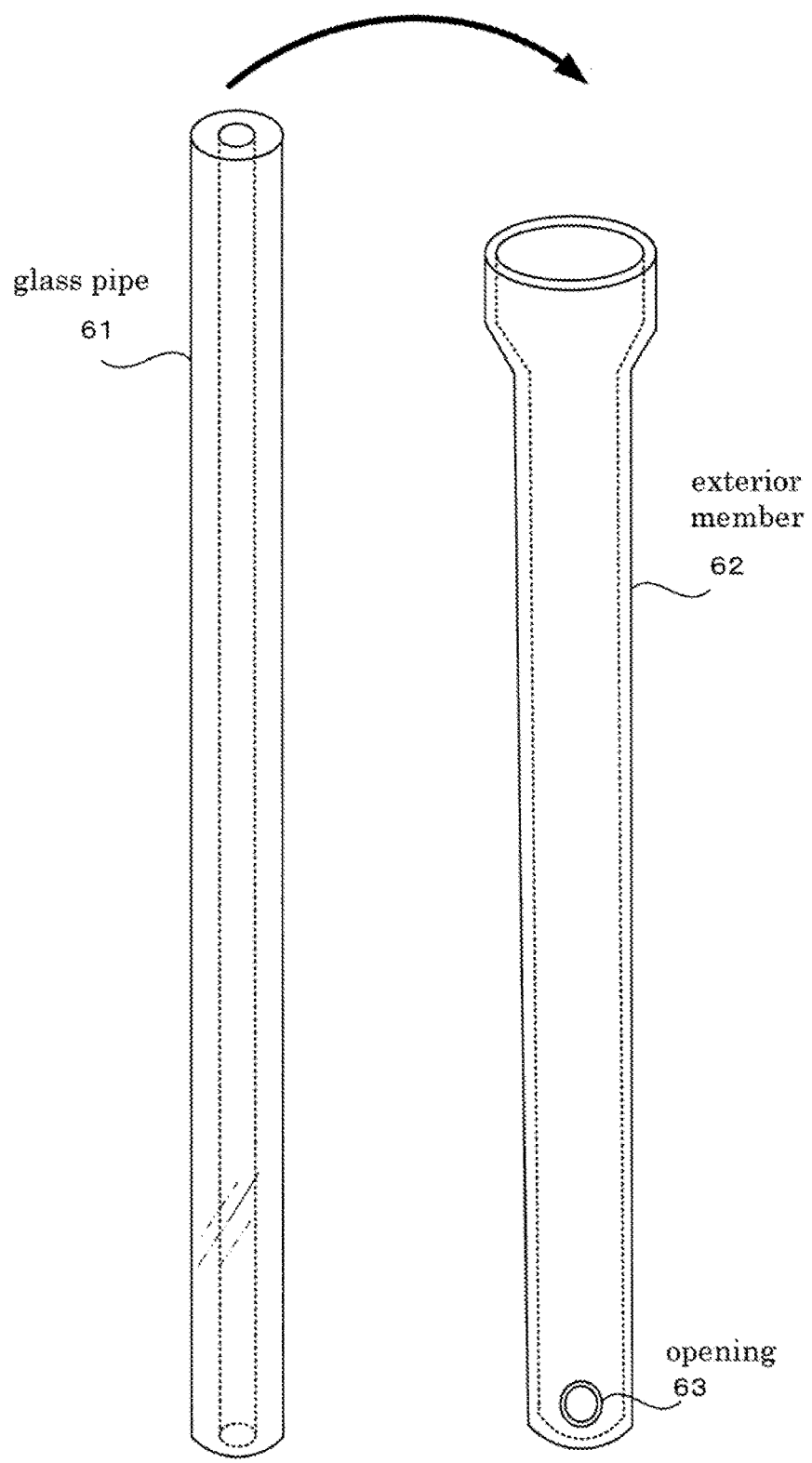
FIG. 6 is a diagram for explaining the configuration of the inspection probe 12 shown in FIGS. 2 and 3, for example.

As shown in FIG. 6, the inspection probe 12 in the present embodiment is configured by inserting a cylindrical hollow glass pipe 61 configured by quartz glass (silica glass) into a cylindrical exterior member 62 configured by stainless steel or the like.

Here, quartz glass contains almost no impurities and is glass configured by a component that is almost 100% $SiO_2$ (silicon dioxide). This quartz glass has the characteristics of extremely high transparency and extremely high light transmittance as compared with commonplace glass. Quartz glass also has the characteristics of having superior heat resistance and chemical resistance to commonplace glass.

As a result of the glass pipe 61 being made of quartz glass having such characteristics, the transmission rate of the reflected light 102 is higher than that of a glass pipe configured by commonplace glass.

It should be noted that an opening 63 for emitting the irradiation light 101 and for the reflected light 102 to enter is provided at the leading end part of the exterior member 62.

Figure 7:
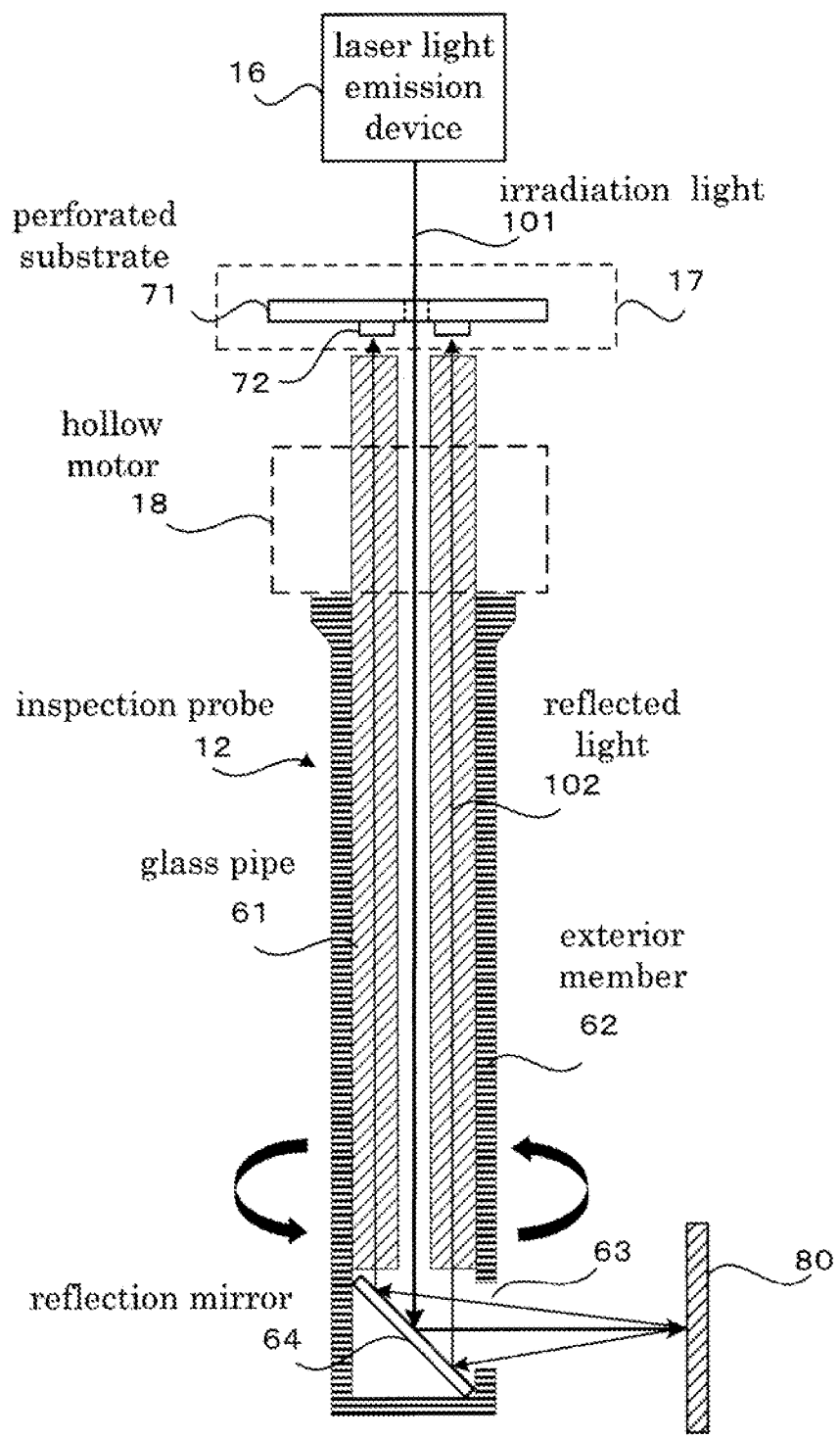
FIG. 7 is a cross-sectional view of an inspection probe 12 and a photoelectric conversion unit 17.

Next, FIG. 7 shows a cross-sectional view of the inspection probe 12 and the photoelectric conversion unit 17 having this configuration. Since FIG. 7 is a diagram for explaining a schematic configuration of the device configuration, the dimensions in the vertical direction are shown in an abbreviated fashion.

The glass pipe 61 transmits the laser light from the laser light emission device 16 as the irradiation light 101 to the leading end part through the hollow region. As also shown in FIG. 6, the exterior member 62 internally accommodates the glass pipe 61. It should be noted that the glass pipe 61 is fixed to the exterior member 62 by being adhered to the exterior member 62, and in a case in which the exterior member 62 is rotated at high speed by the hollow motor 18, the glass pipe 61 is rotated at high speed in conjunction with this rotation.

Further, a reflection mirror 64, which is a reflective member, is mounted at the leading end part of the exterior member 62 and inclined at an angle of 45 degrees with respect to the horizontal direction. As a result, the reflection mirror 64 reflects the irradiation light 101 that has passed through the hollow region of the glass pipe 61 and changes the traveling direction thereof by 90 degrees. As a result, the irradiation light 101 is emitted from the opening 63 and irradiates the inner face of the inspection target 80.

Here, a case in which the installation angle of the reflection mirror 64 is 45 degrees and the traveling direction of the irradiation light 101 is changed by 90 degrees is explained; however, depending on the inspection target face, the installation angle of the reflection mirror 64 may be set to an angle other than 45 degrees, and the traveling direction of the irradiation light 101 may be changed to a direction other than by 90 degrees.

In addition, the reflected light 102 that has been reflected at the inner face of the inspection target 80 enters this opening 63 and is reflected by the reflection mirror 64, whereby its traveling direction changes by 90 degrees. Then, the reflected light 102 whose traveling direction has changed by 90 degrees is transmitted to the photoelectric conversion unit 17 via a region other than the hollow region of the glass pipe 61; that is, via a region configured by quartz glass.

With such a configuration, in the inspection probe 12, the irradiation light 101 is transmitted to the leading end part through the hollow region of the glass pipe 61 and is reflected by the reflection mirror 64 provided at the leading end part, whereby the inner face of the inspection target 80 is irradiated by the irradiation light 101, and the reflected light 102 reflected from the inner face of the inspection target 80 is reflected by the reflection mirror 64 and transmitted to the photoelectric conversion unit 17 via a region other than the hollow region of the glass pipe 61.

Further, the photoelectric conversion unit 17 is configured by a perforated substrate 71, which is a substrate-shaped member, that is provided with a hole through which to allow the laser beam from the laser light emission device 16 to pass, with a photoelectric conversion sensor 72 provided at the periphery of the hole, the photoelectric conversion sensor being disposed so as to be positioned close to an end face of the glass pipe at an opposite end from the leading end part of the inspection probe.

Next, the configuration of the perforated substrate 71 shown in FIG. 7 is explained with reference to the perspective view of FIG. 8.

Figure 8:
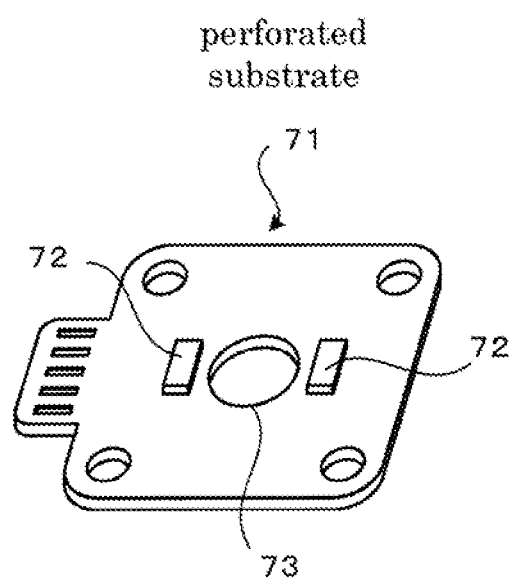
FIG. 8 is a perspective view for explaining the configuration of the perforated substrate 71 shown in FIG. 7.

The perforated substrate 71 is, as shown in FIG. 8, provided with a laser beam passage hole 73 at its center, and has photoelectric conversion sensors 72 mounted at each of the left and right sides of the laser beam passage hole 73. The photoelectric conversion sensor 72 is a small-sized light receiving element configured by a photodiode or a CMOS sensor, and is configured as a chip component. As a result of the photoelectric conversion sensor 72 being configured as a chip component, it is surface-mounted in the vicinity of the laser beam passage hole 73.

Further, as a result of using this kind of small-sized component as the photoelectric conversion sensor 72, the photoelectric conversion sensor 72 can be disposed close to the end face of the glass pipe 61. Since the reflected light emitted from the end face of the glass pipe 61 is diffused, when the distance between the end face of the glass pipe 61 and the photoelectric conversion sensor 72 increases, the amount of reflected light received by the photoelectric conversion sensor 72 is reduced. Therefore, it is preferable that the photoelectric conversion sensor 72 is disposed as close to the end face of the glass pipe 61 as possible.

For example, in a case in which the light receiving angle of the photoelectric conversion sensor 72 is 120 degrees and the emission angle of the reflected light 102 from the end face of the glass pipe 61 is 120 degrees, the photoelectric conversion sensor 72 is disposed at a distance of 1 mm or less, preferably about 0.6 mm, from the end face of the glass pipe 61.

In a case of attempting to receive the reflected light emitted from the end face of the glass pipe 61 without using this kind of small-sized photoelectric conversion sensor 72, the configuration of the photoelectric conversion unit 17 becomes more complex.

Figure 9:
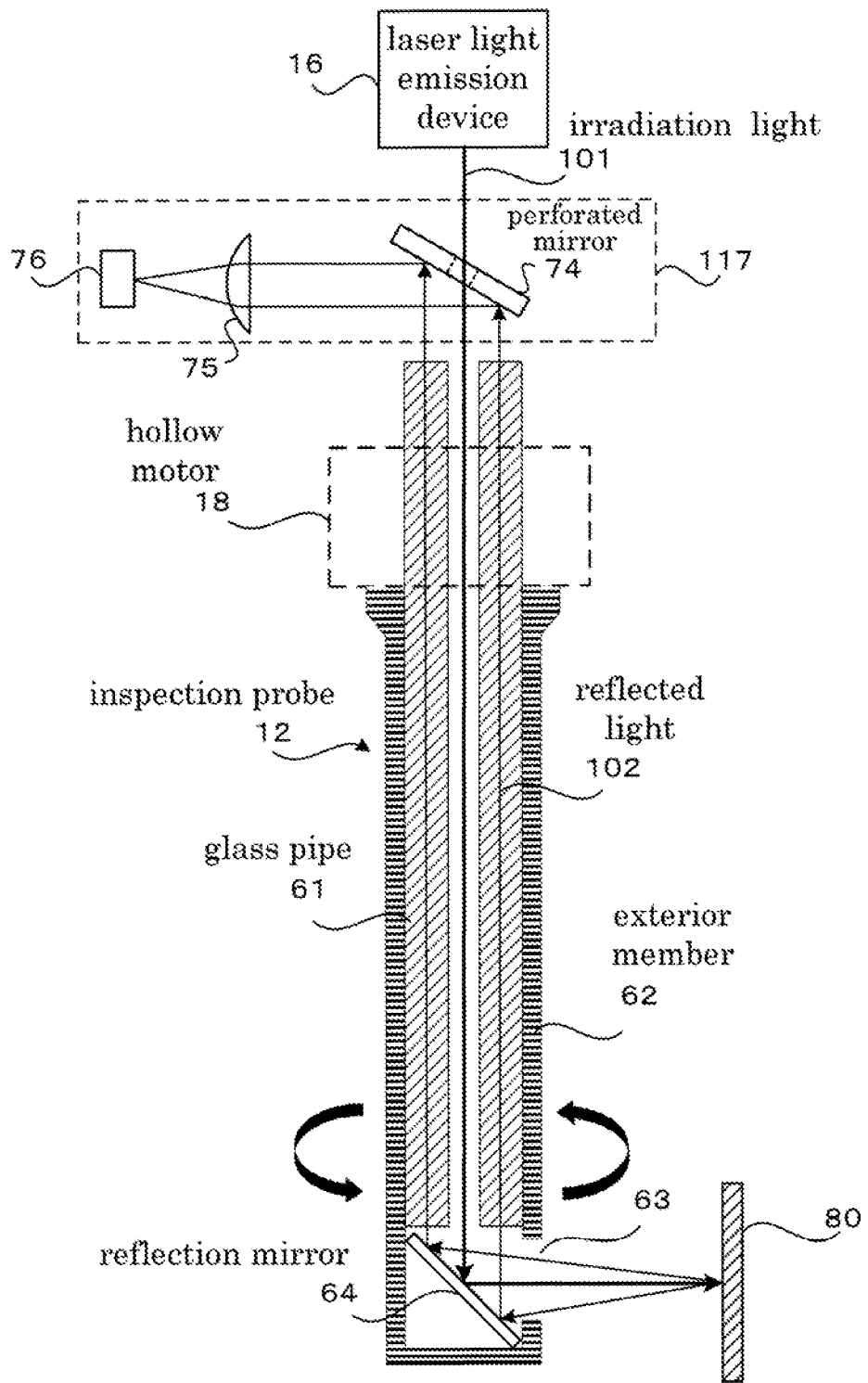
FIG. 9 is a diagram for explaining the configuration of a photoelectric conversion unit 117, which is an example of the photoelectric conversion unit when a small-size photoelectric conversion sensor 72 is not used.

An example of a photoelectric conversion unit configured without using the small-sized photoelectric conversion sensor 72 is shown in FIG. 9 as photoelectric conversion unit 117.

The photoelectric conversion unit 117 shown in FIG. 9 is configured by a perforated mirror 74, a condenser lens 75, and a photoelectric conversion sensor 76. In the photoelectric conversion unit 117, as a result of the photoelectric conversion sensor 76 being configured as a large component, after the reflected light emitted from the glass pipe 61 is reflected by the perforated mirror 74, the light is collected by the condenser lens 75 and then received by the photoelectric conversion sensor 76.

The photoelectric conversion unit 117 using the photoelectric conversion sensor 76, which, in this way, is not small-sized, having the above-described configuration, has a large number of parts and also has a large size. Therefore, it is disadvantageous with a view to miniaturization of the device, and the manufacturing costs are high.

In contrast, the photoelectric conversion unit 17 in the cylindrical inner face inspection device 10 of the present embodiment is configured by only the perforated substrate 71 as shown in FIG. 8, and therefore, optical parts such as a condenser lens are not required, and miniaturization is possible.

Next, an aspect in which the reflected light 102 is transmitted by the inspection probe 12 shown in FIG. 7 is explained with reference to FIG. 10.

Figure 10:
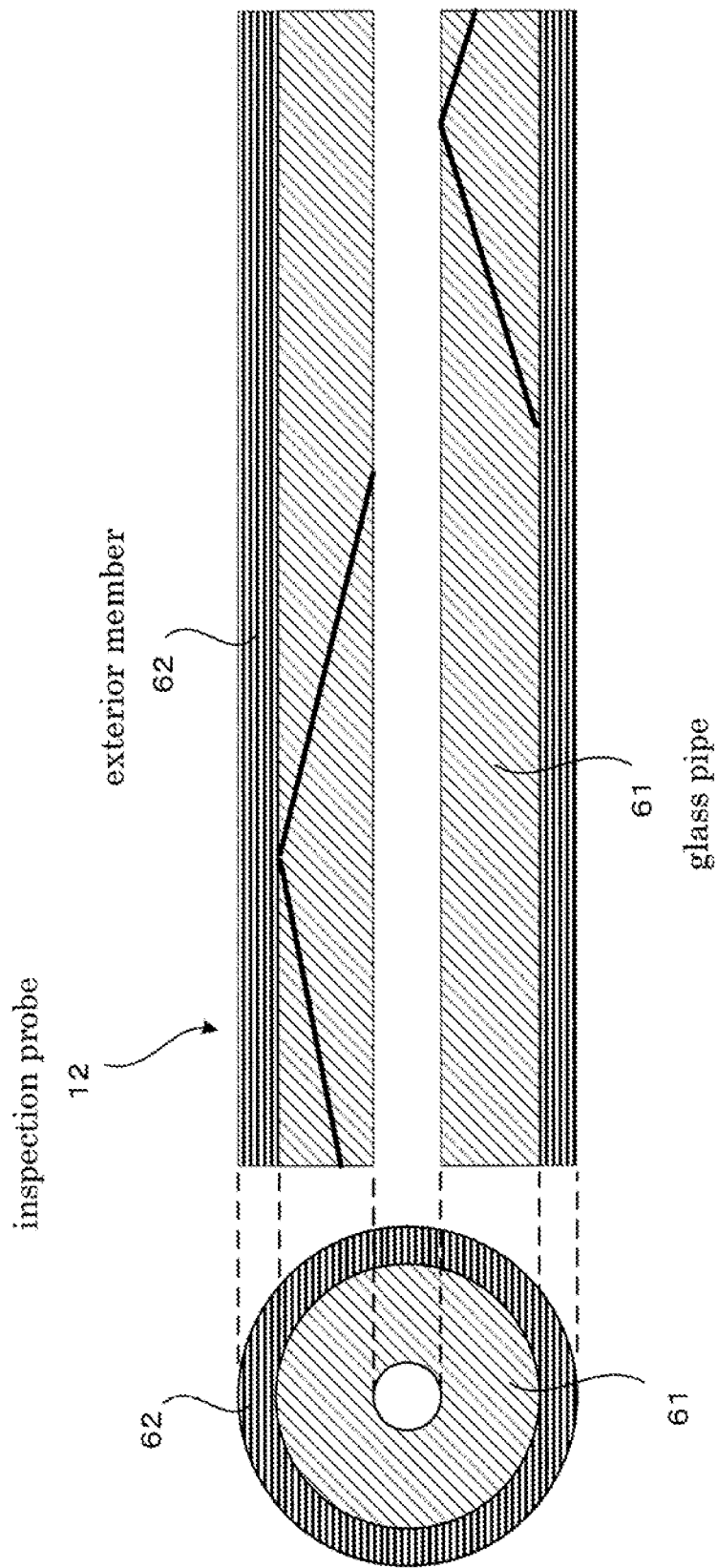
FIG. 10 is a diagram for explaining how reflected light 102 is transmitted by the inspection probe 12 shown in FIG. 7.

Referring to FIG. 10, it is evident that the reflected light 102 incident from one end of the inspection probe 12 propagates in a region other than the hollow region of the glass pipe 61 in the inspection probe 12; that is, within a region configured by quartz glass. It should be noted that in FIG. 10, the reflected light 102 that has entered the glass pipe 61 is shown to propagate linearly; however, since, actually, reflection is repeated at the inner face of the glass pipe 61 and the light propagates in the glass pipe 61 while being diffused, when it is emitted from the opposite end face of the glass pipe 61, it becomes averaged at the donut-shaped end face and emitted therefrom. That is, the light receiving sensitivity is not affected by the positional relationship between the photoelectric conversion sensors 72 and the glass pipe 61.

Further, to the extent that the end surface of the glass pipe 61 is planar (mirror surface), the amount of light received at the photoelectric conversion sensors 72 increases. Further, by configuring the end surface of the glass pipe 61 with frosted glass (rough surface), deviation of scattered light is further averaged. However, by configuring the end face of the glass pipe 61 with frosted glass, the amount of light received at the photoelectric conversion sensors 72 decreases.

For example, in a case in which a certain fixed amount of reflected light 102 is transmitted, in a case in which the amount of light received at the photoelectric conversion sensors 72 is 0.3 mW as a result of using frosted glass at the end faces at both ends of the glass pipe 61, by making the end faces at both ends mirror faces, the amount of light received increases to 0.8 mW.

In addition, in the inspection probe 12 in the present embodiment, a configuration in a case of using a cylindrical columnar glass pipe 61 having a hollow region is described; however, the glass pipe 61 is not limited to a cylindrical columnar configuration.

Figure 11:
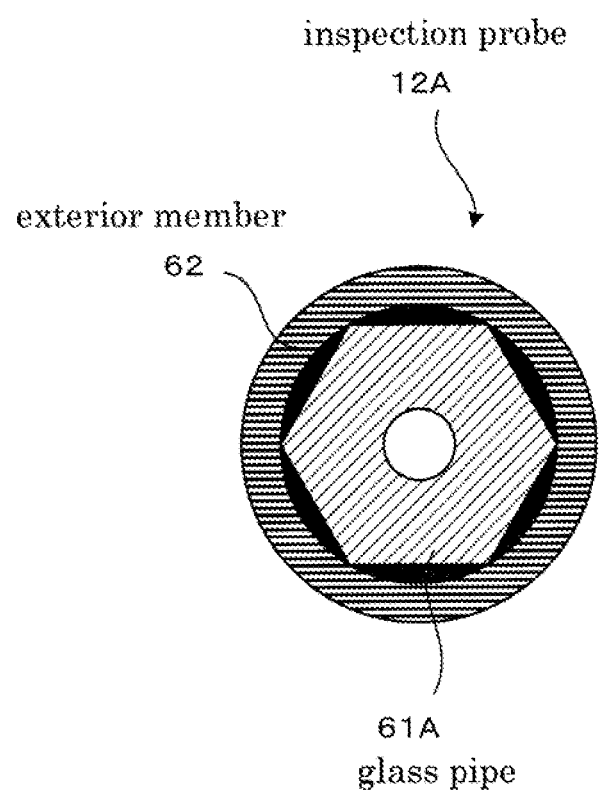
FIG. 11 is a diagram showing the configuration of an inspection probe 12A configured using a glass pipe other than a cylindrical glass pipe 61.

FIG. 11 shows the configuration of an inspection probe 12A, which is an example of an inspection probe configured using a glass pipe other than a cylindrical columnar glass pipe 61. In the inspection probe 12A shown in FIG. 11, a hexagonal columnar glass pipe 61A is accommodated in the exterior member 62. It should be noted that in order to maximize the light receiving surface area for receiving the diffused light 102, it is most advantageous to use a cylindrical columnar glass pipe 61 as used in the present embodiment.

Next, the effect due to configuring the inspection probe 12 using the glass pipe 61 in the cylindrical inner face inspection device 10 of the present embodiment is explained.

Figure 12:
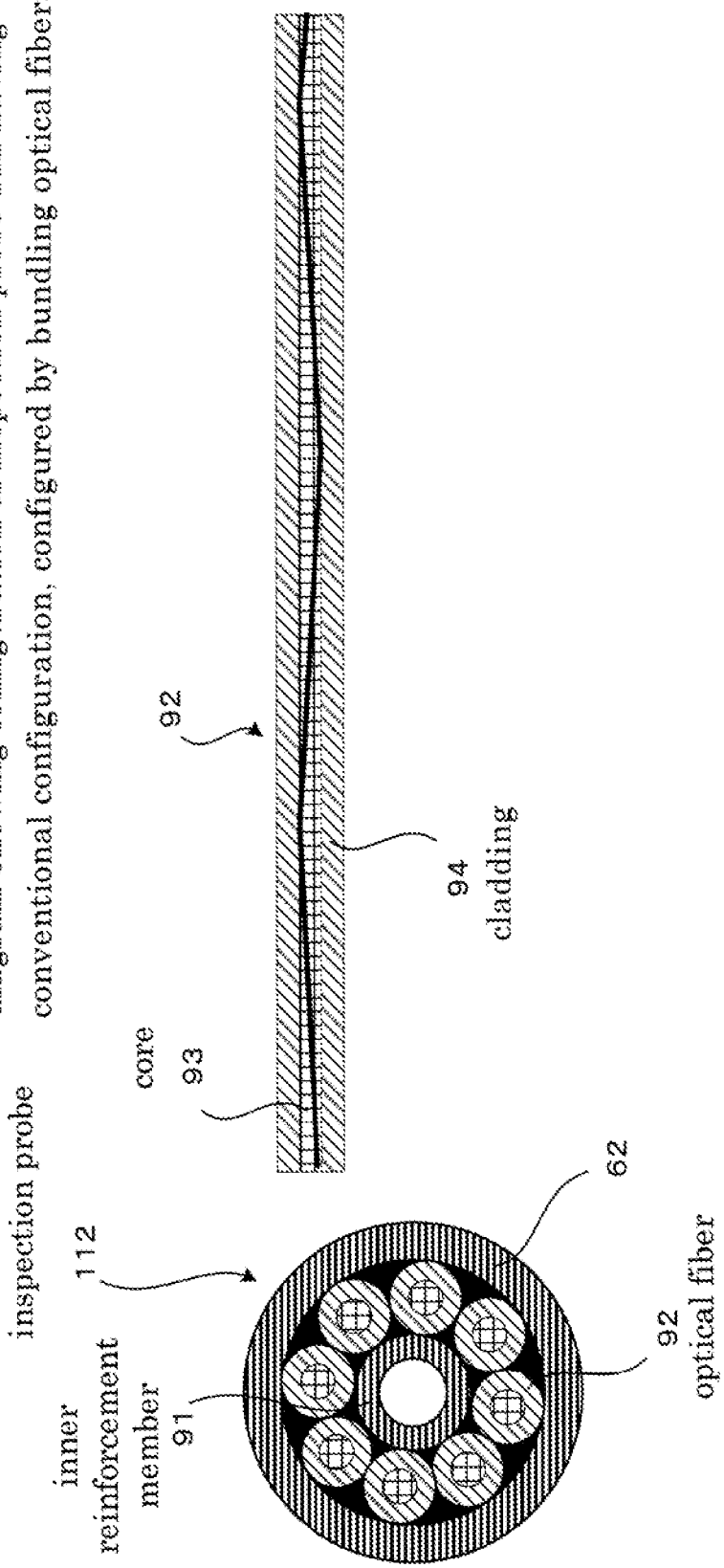
FIG. 12 is a diagram showing an inspection probe 112 configured using an optical fiber.

First, for comparison, FIG. 12 shows an inspection probe 112 configured using an optical fiber as presented in Patent Document 1 described above.

In the inspection probe 112 shown in FIG. 12, an inner reinforcement member 91 configured by an aluminum pipe or the like is installed in the exterior member 62, and plural optical fibers 92 are installed between the inner reinforcement member 91 and the outer member 62.

Each optical fiber 92 is configured by a core 93 and a cladding 94, and because the core 93 and the cladding 94 are configured to have different refractive indices, light that has entered the core 93 is almost completely reflected at the boundary portion between the core 93 and the cladding 94 and propagates inside the core 93. That is, in the optical fiber 92, the core 93 portion is used to transmit light.

In this way, in the inspection probe 112 having the conventional structure in which the optical fibers 92 are bundled as shown in FIG. 12, an inner reinforcement member 91 is required to secure a region through which the irradiation light 101 passes, and in addition, since only the core 93 portion of the optical fiber 92 is a light receiving region that is capable of transmitting the received reflected light 102 to the other end, the light receiving area that can effectively receive the reflected light 102 is smaller than that of the inspection probe 12 in the present embodiment.

Comparing the inspection probe 12 in the present embodiment shown in FIG. 10 with the inspection probe 112 using the bundle of optical fibers 92 shown in FIG. 12, it is evident that the cross-sectional area of the glass pipe 61 in FIG. 10 is several times larger than the total cross-sectional area of the core 93 portions of the plural optical fibers 92 in FIG. 12.

It should be noted that the glass pipe 61 in the present embodiment has an outer diameter of 3 mm and an inner diameter of 1 mm, and the exterior member 62 has an outer diameter of 5 mm and an inner diameter of 3 mm.

Here, since it is difficult to calculate the total cross-sectional area of the core 93 region of the optical fibers 92 in the inspection probe 112 having the conventional configuration, it is difficult to calculate the difference between the light receiving area of the inspection probe 12 in the present embodiment and the light receiving area of the inspection probe 112 having the conventional configuration. However, in the inspection probe 112 having the conventional configuration, even in a case in which a simple calculation is performed omitting the inner reinforcement member 91, for example, the light receiving area of the inspection probe 12 in the present embodiment is at least four times larger than the light receiving area of the inspection probe 112 having the conventional configuration.

Compared with the optical fiber 92 configured by the core 93 and the cladding 94, the transmission rate of the glass pipe 61 configured by only quartz glass is low.

However, the light receiving area of the inspection probe 12 in the present embodiment is, as described above, much broader than the light receiving area of the inspection probe 112 having the conventional configuration, and therefore, the amount of reflected light 102 transmitted to the photoelectric conversion unit 17 is larger than in a case in which the inspection probe 112 having the conventional configuration is used.

The extent of the difference in the amount of the reflected light 102 that is transmitted in a case in which the inspection probe 12 of the present embodiment is used, and in a case in which the inspection probe 112 having the conventional configuration is used, is explained with reference to FIG. 13.

Here, explanation is made based on the assumption that the light receiving area for the reflected light 102 in the inspection probe 12 of the present embodiment is 100, and the light receiving area of the inspection probe 112 having the conventional configuration is 25, which is one quarter of the size. Further, explanation is made based on the assumption that the transmission rate of the inspection probe 12 of the present embodiment is 80% and the transmission rate of the inspection probe 112 having the conventional configuration is 98%.

In the inspection probe 12 in the present embodiment, in a case in which the reflected light 102 is received at a light amount of 100, since the transmission rate is 80%, it will be transmitted to the photoelectric conversion unit 17 at a light amount of 80.

In contrast, since the inspection probe 112 having the conventional configuration can only receive the reflected light 102 at a light amount of 25, even if the transmission rate is 98%, the amount of reflected light 102 transmitted to the photoelectric conversion unit 17 will be 24.5.

Figure 13:
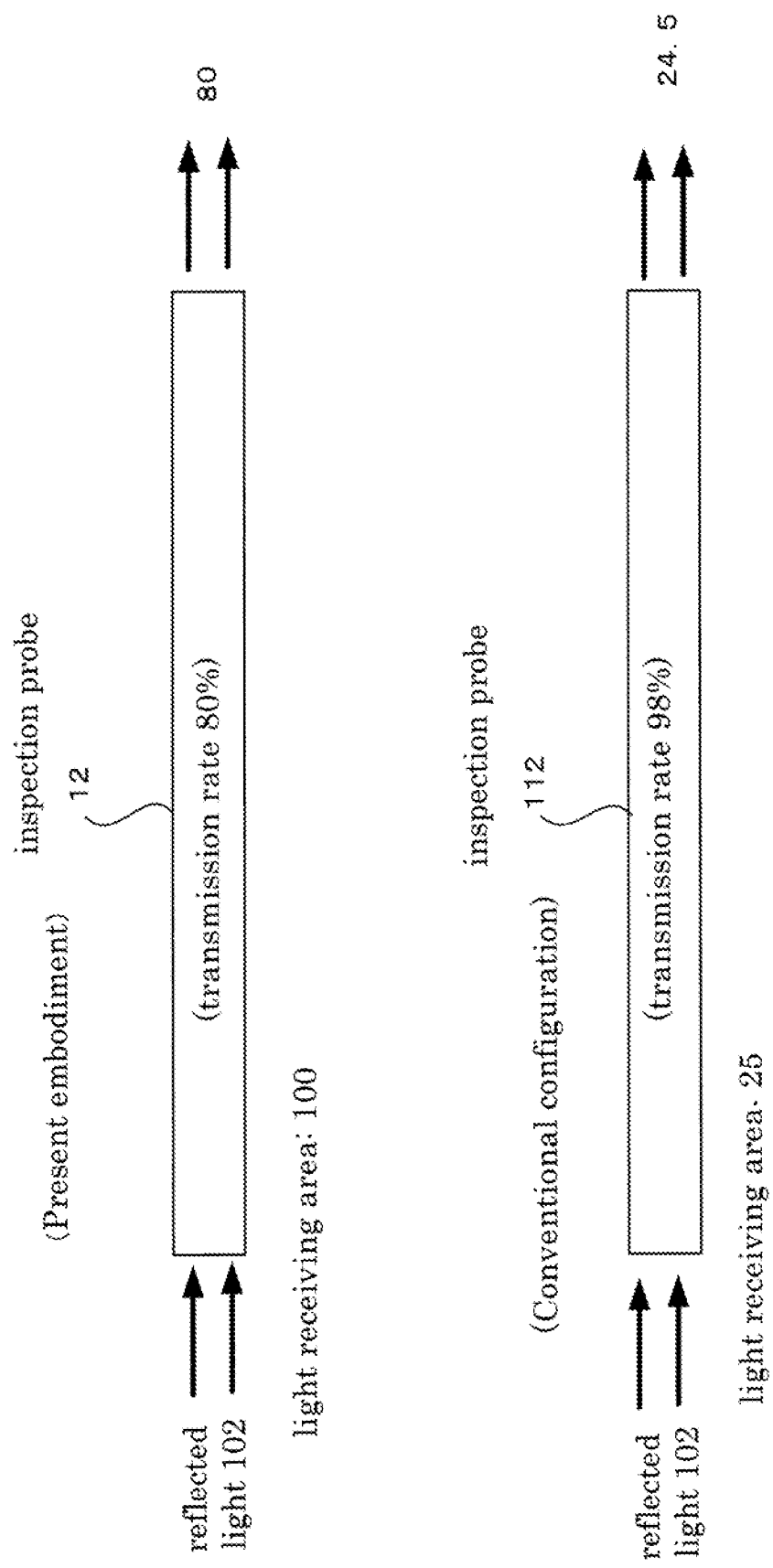
FIG. 13 is a diagram for explaining how much the amount of reflected light 102 that is transmitted differs between a case in which the inspection probe 12 according to the embodiment of the present invention is used and a case in which an inspection probe 112 having a conventional configuration is used.

That is, referring to FIG. 13, even if the inspection probe 112 having the conventional configuration using the optical fibers 92 has a higher transmission rate, for example, since the inspection probe 12 of the present embodiment has a significantly larger light receiving area, the amount of light transmitted to the photoelectric conversion unit 17 is larger in the inspection probe 12 of the present embodiment.

As a result, the required sensitivity for the photoelectric conversion sensors 72 used in the cylindrical inner face inspection device 10 of the present embodiment does not need to be particularly high. As a result, it is possible to use a small-sized photoelectric conversion sensor 72 such as a chip component.

Further, as shown in FIG. 6, the inspection probe 12 of the present embodiment can be created simply by inserting the glass pipe 61 into the exterior member 62 and securing it therein. In contrast, as shown in FIG. 12, for the inspection probe 112 having the conventional configuration, it is necessary to insert a bundle of optical fibers 92 into the exterior member 62 and to further insert an interior reinforcement member 91 and secure these members so that they are able to rotate at high speed.

In this way, for the inspection probe 12 of the present embodiment, as a result of the simplification of the configuration as compared with the inspection probe 112 having a conventional configuration, the manufacturing man-hours are low and the manufacturing costs are low as compared with the inspection probe 112 having the conventional configuration.

In addition, in the cylindrical inner face inspection device 10 of the present embodiment explained above, the laser beam from the laser light emission device 16 was made to pass through the hollow region of the glass pipe 61 in the inspection probe 12 and arrive at the reflection mirror 64 at the leading end part.

Instead of this configuration, it is also possible to provide a configuration in which an optical fiber for transmitting the laser light from the laser light emission device 16 to the leading end part of the inspection probe 12 is provided in the hollow region of the glass pipe 61.

Figure 14:
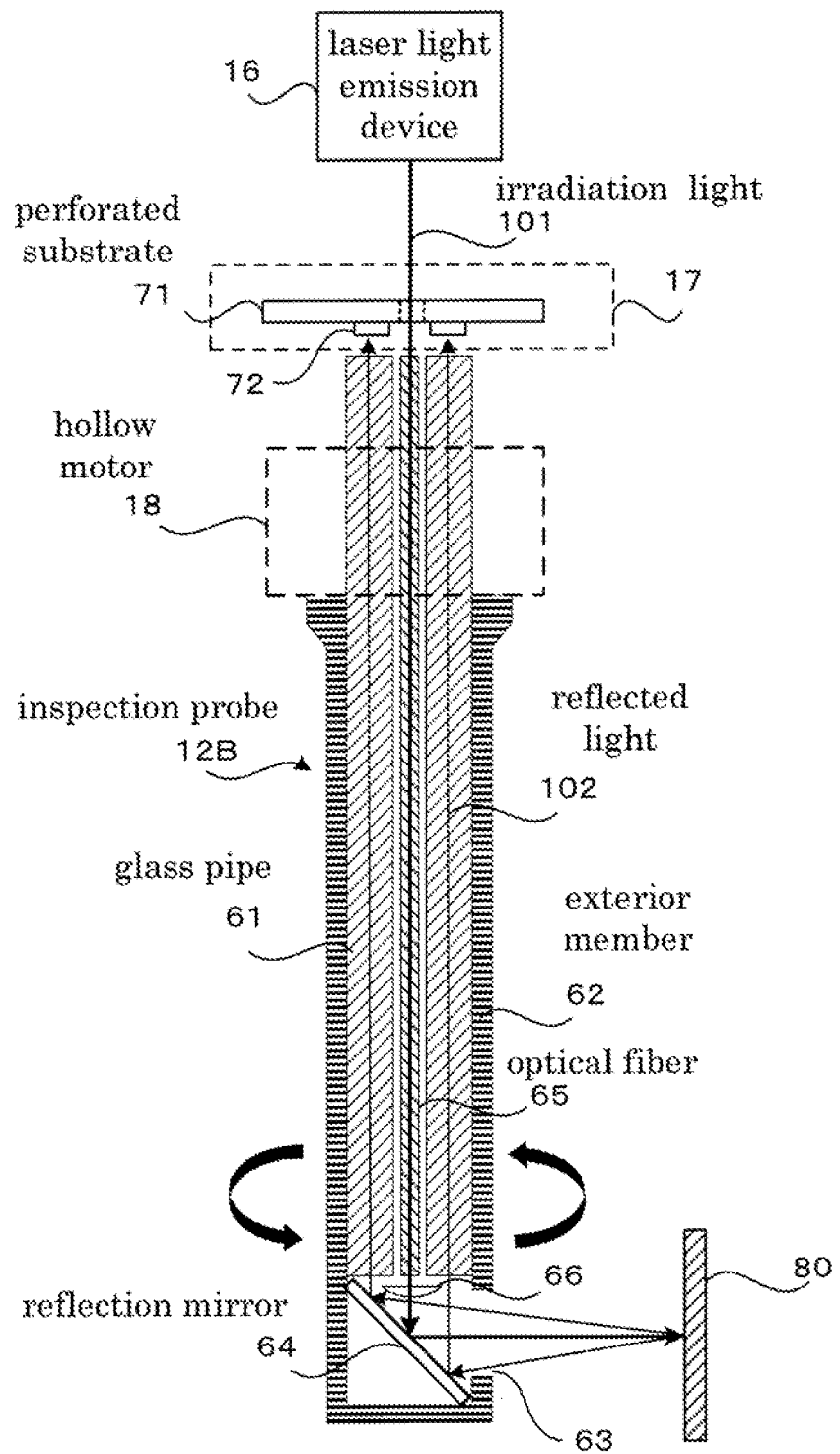
FIG. 14 is a diagram showing an inspection probe 12B having a configuration in which an optical fiber is provided in a hollow region of the glass pipe 61.

An example of an inspection probe having this kind of configuration is shown in FIG. 14 as inspection probe 12B.

In the inspection probe 12B shown in FIG. 14, an optical fiber 65 is provided in the hollow region of the glass pipe 61, and a condenser lens 66 for condensing the irradiation light 101 emitted from the optical fiber 65 is provided. The irradiation light 101 condensed by the condenser lens 66 is reflected by the reflection mirror 64, passes through the opening 63, and is irradiated onto the inspection target 80.

Figure 15:
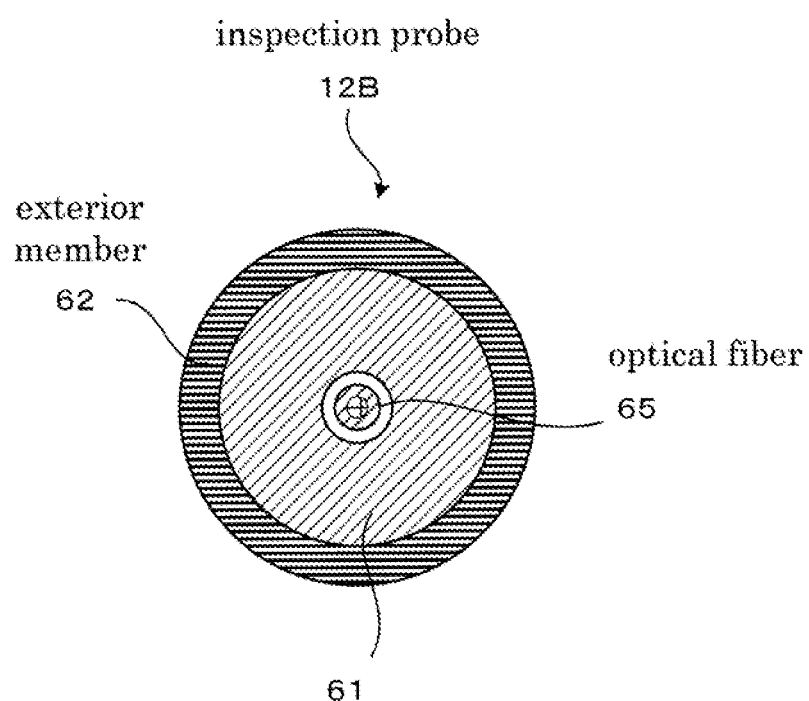
FIG. 15 is a cross-sectional view of the inspection probe 12B having the configuration shown in FIG. 14.

A cross-sectional view of the inspection probe 12B having the configuration shown in FIG. 14 is shown in FIG. 15. Referring to FIG. 15, it is evident that in the inspection probe 12B, the configuration is such that the optical fiber 65 is accommodated in the hollow region at the center of the glass pipe 61.

It should be noted that in the embodiment described above, a case in which the inspection probe 12 is configured using the glass pipe 61 has been explained; however, it also would be possible to configure the inspection probe using a pipe-shaped member formed of a transparent material having high transparency such as an acrylic resin.

EXPLANATION OF THE REFERENCE SYMBOLS

10 Cylindrical inner face inspection device
11 Main body
12, 12A, 12B
 Inspection probe
13 Arm
14 Elevation device
15 Support pillar
16 Laser light emission device
17 Photoelectric conversion unit
18 Hollow motor
19 Base stand
20 Terminal device
21 Control unit
22 Processing unit
23 Display unit
61, 61A Glass pipe
62 Exterior member
63 Opening
64 Reflection mirror
65 Optical fiber
66 Condenser lens
71 Perforated substrate
72 Photoelectric conversion sensor
73 Laser beam passage hole
74 Perforated mirror
75 Condenser lens
76 Photoelectric conversion sensor
80 Inspection target
91 Inner reinforcement member
92 Optical fiber
93 Core
94 Cladding
101 Irradiation light
102 Reflected light
112 Inspection probe
117 Photoelectric conversion unit

The invention claimed is:

1. A cylindrical inner face inspection device, comprising:
a laser light emission device configured to generate a laser beam for irradiation at an inner face of a cylindrical inspection target;
an inspection probe including:
 a pipe-shaped member formed from a transparent material, the pipe-shaped member being configured to transmit the laser beam from the laser light emission device as irradiation light through a hollow region,
 a cylindrical exterior member configured to internally accommodate the pipe-shaped member, and
 a reflective member provided at a leading end part of the exterior member,
 the irradiation light being irradiated onto the inner face of the inspection target by the irradiation light being transmitted through the hollow region of the pipe-shaped member to the leading end part and by being reflected by the reflective member provided at the leading end part, and reflected light reflected from the inner face of the inspection target being reflected by the reflective member and transmitted through a region other than the hollow region of the pipe-shaped member;
a rotation device configured to rotate the inspection probe;
a photoelectric conversion unit configured to convert the reflected light, which has been emitted from an end face of the pipe-shaped member at an opposite end from the leading end part of the inspection probe, into an electrical signal; and
a movement device configured to move a main body part comprising the laser light emission device, the inspection probe, the rotation device and the photoelectric conversion unit.

2. The cylindrical inner face inspection device according to claim 1, wherein the photoelectric conversion unit comprises a substrate member that is provided with an opening for the laser beam from the laser light emission device to pass through, a photoelectric conversion sensor is installed at a periphery of the opening, and the substrate member is disposed such that the photoelectric conversion sensor is positioned in a vicinity of the end face of the pipe-shaped member at the opposite end from the leading end part of the inspection probe.

3. The cylindrical inner face inspection device according to claim 1, further comprising an optical fiber for transmitting the laser beam from the laser light emission device to the leading end part of the inspection probe, the optical fiber being provided in the hollow region of the pipe-shaped member.

4. The cylindrical inner face inspection device according to claim 1, wherein the pipe-shaped member comprises a cylindrical glass pipe configured by quartz glass.

* * * * *